June 7, 1927.
O. A. HANFORD
1,631,633
GLASS FORMING APPARATUS
Filed July 9, 1923
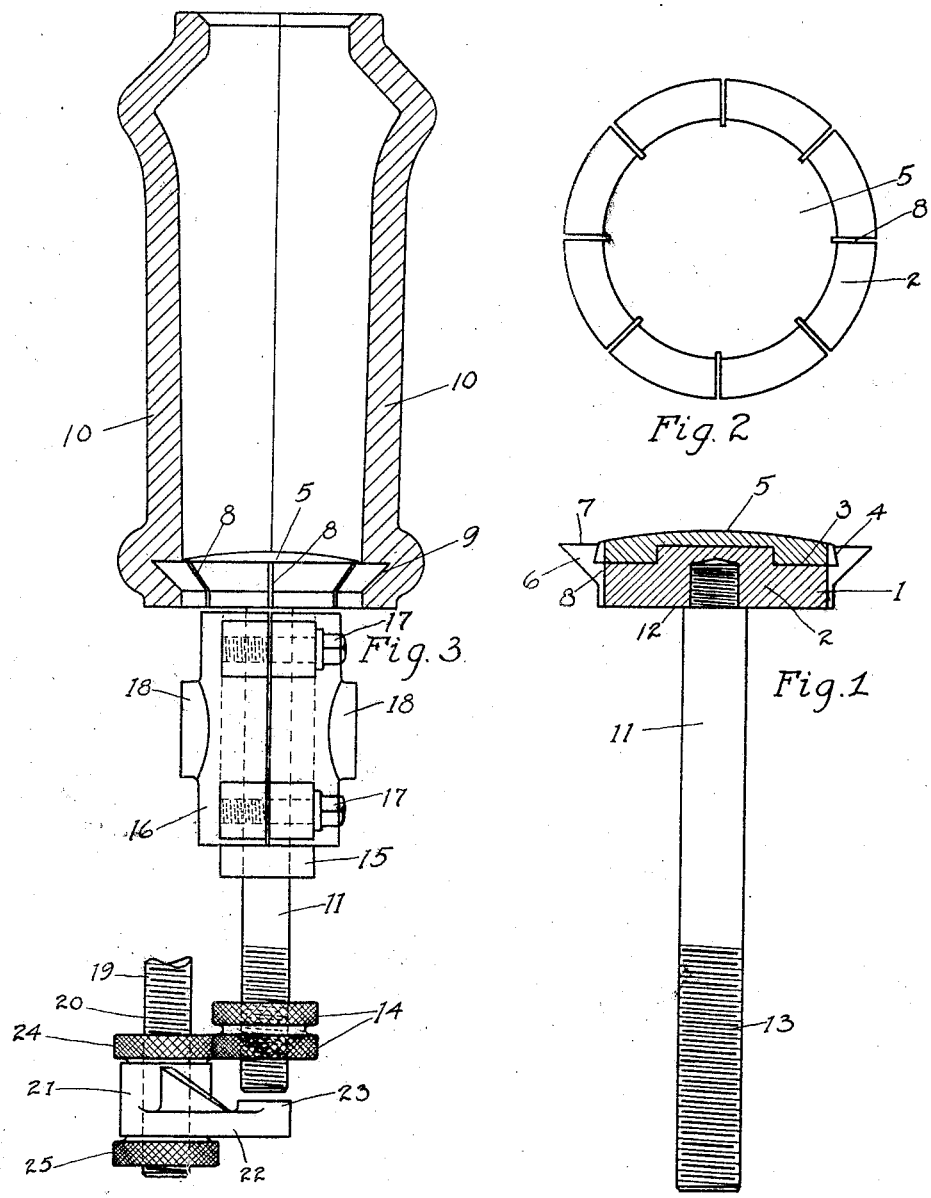
ORIN A. HANFORD INVENTOR.
BY
Edwin P. Cates
ATTORNEY.

Patented June 7, 1927.

1,631,633

UNITED STATES PATENT OFFICE.

ORIN A. HANFORD, OF COLUMBUS, OHIO, ASSIGNOR TO THE FEDERAL GLASS COMPANY, OF COLUMBUS, OHIO, A CORPORATION OF OHIO.

GLASS-FORMING APPARATUS.

Application filed July 9, 1923. Serial No. 650,337.

My invention relates to glass forming apparatus and has particular relation to the formation of the bottom portion of glass blanks during the stages prior to, and including, the final formation of the article to be produced. It is particularly suitable in the production of blown glassware of the finer type, such as blown tumblers, et cetera.

Heretofore, in the molding art as applied to the manufacture of blown glass articles, it has been the custom to control the formation of the bottom portion of the article by means of a bottom plate formed separately from the mold halves. The operation of this bottom plate has been performed both by hand and by machinery. In the hand method, the bottom plate has been formed of both metal and wood. In this hand production of blown glassware, it has been found that the wooden bottom plate produces by far the finer quality of ware as the surface of the wood always became charred to some extent by coming in contact with the hot glass blanks and thus forming a very smooth surface. This use of wooden bottom plates has been decidedly disadvantageous in that they require frequent renewal. In the machinery method of producing blown glassware, the wooden bottom plate cannot be used because of the extremely hard service to which it would be subjected, and it has, therefore, been the custom to use a metal bottom plate because of its greater resistence to the heat of glass and its greater durability. However, in the use of this metal bottom plate in blowing machines, it has been necessary to lubricate the surface of the bottom plate with different lubricating compositions, such as linseed oil, charing coal, etc. It has been necessary to continuously lubricate these metal bottom plates at frequent regular intervals and even with such frequent lubrication these bottom plates become very hot and over-heated whereby they not only fail to produce the desired cooling effect upon the ware, but their surfaces usually become warped thus giving the bottom of the ware an undesirable shape. Furthermore, even when the metal bottom plate has been frequently removed and frequently lubricated it is difficult to produce a desired cooling effect on the glass in a machine capable of large production. The resulting glassware produced by these blowing machines provided with metal bottom plates have uneven and thin bottom portions due to not sufficient cooling, and do not have a shiny, clean surface, which is desired in blown ware of the finer type.

My present invention not only overcomes the difficulties of the prior art, but I have also discovered that far better results can be obtained by the provision of a bottom plate constructed either partially, or wholly, of a porous substance for directly controlling the forming and cooling of the glass blank. The treatment is such that the porous substance will always absorb and contain a sufficient amount of fluid to cool the desired portion of the glass blank, and prevent any overheating. Furthermore, my invention is such that the fluid contained in the porous portion of the bottom plate will not only form a cushion for the ware being formed, but it will also keep the porous bottom plate surface in a smooth and comparatively cool condition merely by the operation of the machine itself.

More specifically, my invention contemplates the provision of a comparatively hard and porous substance to preferably form that part of the bottom plate of a mold which contacts with the parison before and during blowing. Therefore, I have provided a novel and simple bottom plate structure which is formed chiefly of metal and is movable independently of the mold section, and which is provided with an inset for such porous substance, such as plaster of Paris or the like where it comes in contact with the glass blank. The operating mechanism of this bottom plate structure is such that it may be raised to set the bottom of the blank prior to blowing, when necessary, and then lowered to form a bottom portion of the mold in order to form the bottom of the glass article when it is finally blown in such mold. The continuous presence of the cooling fluid in the pores of the porous structure of the bottom plate not only is effective to sufficiently cool the blank when it is set by the bottom plate, but will also be effective to cool and form a cushion between the bottom plate structure, and the glass article being blown, whereby, the bottom of the glass article will be evenly distributed, clean, and shiny.

The preferred embodiment of my invention is shown in the accompanying drawings wherein similar characters of reference designate corresponding parts and wherein;

Figure 1 is a front elevation partly in section of my novel bottom plate structure and showing the preferred manner of combining the porous bottom plate structure with the metal structure of such bottom plate.

Figure 2 is a plan view of the structure shown in Figure 1.

Figure 3 is an elevation partly in section of my novel bottom plate structure as applied to the mold and showing the manner of connecting the bottom plate with the bottom of the mold and the mechanism for raising and lowering this bottom plate within the mold.

In the drawings, the bottom plate structure is generally designated 1, and as shown in Figure 1, it comprises a disc like metal portion 2 with an annular recess 3 in the upper surface thereof. The outer periphery of this annular recess 3 is under-cut as at 4, as is best shown in Figure 1. This recess 3 and under-cut portion 4 is adapted to receive a porous substance 5. It will be understood that a variety of porous substances 5 may be satisfactorily used, but I have found best from practice, and I preferably use, a porous substance made of dental plaster of Paris.

This plaster of Paris 5 is preferably placed in the annular recess 3 and under-cut portion 4 when moist and is then allowed to harden. The hardened plaster of Paris is then perfectly turned and smoothed up to give the upper surface 5 the proper contour in accordance with the shape of the bottom of the ware to be produced. The outer edge of the metal disc 2 is tapered on its under side as at 6 while its upper surface 7 is preferably horizontal. This outer edge of the metal disc 2 is provided with a plurality of vertical slots 8 around the circumference thereof as shown in Figure 2.

Designed to receive the tapered portion 6 of the metal disc 2, is the inwardly tapered recess 9 of a suitable sectional mold 10. This inwardly extending and tapered recess 9 is preferably formed adjacent the lower edge of the mold sections 10, and, as best shown in Figure 3, the recess 9 is adapted to conform to the surface 6 and 7 of the bottom plate 1 when the mold sections 10 are in closed position. It will thus be obvious that when the mold sections are in closed position that the tapered surface of the metal disc 2 and the inwardly tapered recess 9 of the mold sections will be adapted to position the bottom plate to form a substantially integral part of the mold whenever such mold is closed.

The bottom plate 1 is preferably provided with a downwardly extending stem 11, which is reduced and threaded into the bottom part of the metal disc 2 as at 12. The lower end of this stem 11 is threaded as at 13 and is designed to receive adjustable collars or lock nuts 14. It will be obvious that these lock nuts 14 may be adjusted in any desired position along the threaded portion of the stem 11.

Referring especially to Figure 3 it will be seen that stem 11 is slidably carried by a bushing 15, which in operation is held firmly within the split sleeve 16 by means of suitable studs or cap screws, 17. The sleeve 16 is preferably supported by means of horizontally extending trunions 18. When the mold is open the bottom plate 1 is designed to be supported by the top portion of the sleeve 16, but when the mold sections are closed, as is shown in Figure 3 the tapered surface 6 of the disc 2 will engage with the inwardly tapered recess 9 to raise the bottom plate 1 into the normal position to form the bottom of the mold.

In the production of blown glassware in blowing machines it is usually customary to set or bat the bottom of the blank just prior to closing the blow mold and giving the blank its final blow to form the completed article. As best shown in Figure 3 the vertical motion of the bottom plate 1 for setting or batting the bottom of the blank just prior to the closing of the mold 10, is obtained through the vertically slidable rod 19 threaded as at 20 to receive and carry the sleeve 21. This sleeve 21 is provided with a horizontally extending integral arm 22 and seat 23. The sleeve 21 is preferably slidably mounted upon the rod 19 and is adjustably positioned on such rod by means of adjustable collars 24 and 25. It will be understood that the rod 19 may be connected to suitable mechanism for raising the seat 23 and to simultaneously raise the bottom of the plate 2 and stem 11 just prior to the closing of the mold sections 10 and after a suitable charge of glass or a blank has been introduced into such mold. Releasing of the rod 19 and its seat 23 will be effective to allow the stem 11 and bottom plate 1 to drop of its own weight. It will also be obvious that the closing of the mold section 10 will be effective to center and properly position the bottom plate 1 in the base of the closed mold.

For the purpose of this case it is hardly necessary to enter into a detailed description of the operation of the mold parts illustrated 1 and 3. It suffices to say that the bottom plate and operating mechanism therefor may be used in connection with practically any blowing machine. As is the customary operation in practically all machines of this type, the mold and bottom plate may be immersed in or sprayed with a suitable cooling fluid during which time a portion of the fluid is absorbed by the porous plaster of Paris 5, which forms the top part of the bottom plate 1. This immersion or spraying preferably takes place after each blowing operation. It need only be briefly pointed out that, after the glass blank is suspended in the open mold sections 10, a sharp pull may be exerted on the rod 19, which shall be effective to raise the bottom plate 1 to deliver a quick upward blow of the porous substance 5 against the bottom of such suspended blank. This action of the bottom plate 1 will have a cooling and shaping effect upon the bottom of the blank. After the bottom plate 1 is lowered, the mold sections 10 are then closed to center the bottom plate in the bottom of the mold structure. As the porous substance 5 will still retain a large portion of the previously absorbed fluid, it will be obvious that, when the blank is blown to completed form, a small cushion of fluid or steam will be formed between the surface 5 and the bottom of the glass article whereby the bottom of the glass article will be made to evenly conform to the exact contour of the surface 5 without injuring or even comparatively heating such porous surface 5.

It will be seen that I have not only provided a novel and efficient bottom plate structure for forming the bottom portion of hollow glass articles but that I have also provided a novel plate structure in combination with a mold structure for setting and particularly forming the glass blank prior to its complete formation within the mold. It will further be obvious that I have provided a novel bottom plate structure which is of porous composition whereby it will always absorb and contain a sufficient amount of cooling fluid to efficiently prevent any over-heating of the bottom plate structure and at the same time maintain the surface of the bottom plate smooth and substantially cool for an indefinite length of time.

It will further be obvious that I have provided a bottom plate structure and operating mechanism whereby the bottom plate may contact with the heated glass for a maximum length of time without any over-heating of the bottom plate. Also that the cooling fluid, which is absorbed and retained by the porous portion of the bottom plate will act as a lubricant as well as a cooling element and produce very bright glassware.

It will be understood that my novel bottom plate structure can be efficiently adapted and utilized for the manufacture of hand blown ware as well as machine blown ware. From the illustrated embodiment of the invention herewith disclosed it will be obvious to those familiar with the art that various shapes and sizes of bottom plate structure may be provided in accordance with the shape of the mold, the shape of the article and the manner of manufacturing the article within the mold. It will also be clear that the entire bottom plate may be made of a porous substance or that this porous substance may be combined wtih a metal bottom plate in any desired manner.

Having thus described my invention, what I claim is:

1. In a device for forming hollow glass articles the combination of a mold and a bottom plate, said bottom plate having a molding surface of plaster of Paris.

2. A mold for forming hollow glassware comprising a vertically movable element having a molding surface of plaster of Paris.

3. In a device for forming hollow glass articles the combination of a mold, and means movable relative to the mold for setting the blank, said means having a molding surface of plaster of Paris.

4. A mold for forming hollow glassware comprising mold halves for forming the body of the article and a reciprocable bottom part having a molding surface of plaster of Paris.

5. A mold for forming hollow glassware comprising mold halves for forming the body of the article and a reciprocable bottom part having a molding surface of plaster of Paris, said bottom being operable to initially set the blank and to subsequently form the mold bottom during final formation of the article.

6. A mold for forming hollow glassware comprising mold halves for forming the body of the article, a reciprocable bottom part having a molding surface of plaster of Paris, and means for raising said bottom to initially set the glass blank and to subsequently lower said bottom part to form the bottom of the mold and the bottom of the completed article.

In testimony whereof I hereby affix my signature.

ORIN A. HANFORD.